United States Patent [19]
Spokoyny et al.

[11] Patent Number: 5,582,802
[45] Date of Patent: *Dec. 10, 1996

[54] CATALYTIC SULFUR TRIOXIDE FLUE GAS CONDITIONING

[76] Inventors: Felix E. Spokoyny, 1650 Samar Pl., Costa Mesa, Calif. 92626; Henry V. Krigmont, 3600 Marigold, Seal Beach, Calif. 90740

[ * ] Notice: The term of this patent shall not extend beyond the expiration date of Pat. No. 5,307,627.

[21] Appl. No.: 270,487

[22] Filed: Jul. 5, 1994

[51] Int. Cl.$^6$ ..................................... F01N 3/10
[52] U.S. Cl. .................. 422/173; 422/168; 422/174; 422/198; 422/199; 422/200; 422/177; 422/180; 422/109; 110/185; 110/216
[58] Field of Search .................................. 422/168–171, 422/109, 173–174, 180, 177, 188, 198–199, 194, 189, 200, 222; 110/345, 216, 185; 122/4 D; 423/244.01, 244.02, DIG. 5, 244.09, 522, 536, 523; 95/58, 63, 69; 96/18, 52, 74, 57; 60/298

[56] References Cited

U.S. PATENT DOCUMENTS

| | | | |
|---|---|---|---|
| 2,408,396 | 10/1946 | Horsley | 423/536 |
| 5,022,226 | 6/1991 | Bell | 60/274 |
| 5,209,062 | 5/1993 | Vollenweider | 422/180 |
| 5,319,929 | 6/1994 | Cornelison et al. | 422/180 |
| 5,320,052 | 6/1994 | Spokoyny et al. | 110/345 |
| 5,330,727 | 7/1994 | Trocciola et al. | 422/177 |

*Primary Examiner*—Robert J. Warden
*Assistant Examiner*—Hien Tran

[57] ABSTRACT

A method and apparatus for the selective control of the sulfur trioxide concentration in flue gases, to enhance the ash removal efficiency of electrostatic precipitators, which includes supporting a catalyst in the path of the flue gas, positioning temperature modifying means in communication with the catalyst, passing the flue gas by the catalyst and selectively varying the temperature of the catalyst, with the temperature modifying means, to vary the amount of catalytic conversion of $SO_2$ in the flue gas to $SO_3$.

12 Claims, 2 Drawing Sheets

CATALYTIC SULFUR TRIOXIDE FLUE GAS CONDITIONING

BACKGROUND OF THE INVENTION

This invention relates to power plant operations, and, more particularly, to an approach for removing particulate matter from a flue gas stream produced in a fossil fuel power plant, especially a coal-fired power plant.

In a fossil fuel power plant, a fuel is burned in air to produce a flue gas. The flue gas heats water in a boiler to generate steam, which turns a turbine to produce power. After passing through various apparatus, the flue gas is exhausted through a stack to the atmosphere.

The flue gas of certain fossil fuels (i.e. coal) includes solid particulate matter and a variety of gaseous contaminants. The maximum permissible emission levels of the particulate matter and gaseous contaminants are set by laws and regulations. The maximum emission levels are typically far less than the amounts present in the flue gas as it is produced, and various types of gas treatment apparatus are usually provided to reduce the particulate matter and gaseous contaminants in the flue gas before it leaves the stack.

In many power plants, particulate matter in the gas stream is removed by electrostatic precipitation. An electrostatic charge is applied to the particulate matter in the flue gas, and the flue gas passes between charged electrodes. The particulate matter is deposited upon the electrode having the opposite charge to that of the particulate and is later removed.

The fuel typically contains from about 0.2 percent to about 6 percent sulfur, which at least in part oxidizes to sulfur dioxide during combustion. A small part of the sulfur dioxide further oxidizes to sulfur trioxide. Since the combustion air and the fuel also contain moisture, the flue gas contains water vapor. The sulfur trioxide and water vapor in the flue gas react to produce sulfuric acid, which deposits upon the particulate matter. The sulfuric acid deposited upon the particulate matter imparts a degree of electrical conductivity to the particulate and promotes the electrostatic precipitation process.

If the fossil fuel contains too little sulfur, so that there is a deficiency of sulfur trioxide, and thence sulfuric acid in the flue gas, the electrostatic precipitator may not function properly because of the high electrical resistivity of the particulate. It is therefore known to add sulfur trioxide from an external source to the flue gas produced from burning low-sulfur fossil fuels. See, for example, U.S. Pat. No. 3,993,429.

In the '429 sulfur trioxide conditioning system, sulfur is burned to form sulfur dioxide, which is passed over a catalyst to achieve further oxidation to sulfur trioxide. The sulfur trioxide is injected into the flue gas flow upstream of the electrostatic precipitator. The amount of injected sulfur trioxide is controlled by varying the amount of sulfur that is burned. Other similar sulfur trioxide systems, which have been successfully used commercially, include a system which starts with a sulfur dioxide feedstock, which is vaporized and then catalytically converted to sulfur trioxide.

Sulfur trioxide injection systems, such as illustrated in the '429 patent, work well and are widely used. In some instances, however, there are drawbacks: high equipment capital costs; a constant supply of sulfur or sulfur dioxide feedstock is required, and this feedstock must be safely handled; the several components of the burning, catalyzing, and injecting system must be kept in good working order; there is a substantial power consumption associated with the process; when the plant or system goes into stand-by condition, the system, at least from the converter forward, must be purged to prevent excessive corrosion of the system and/or blockage of the probe nozzles; the injection arrangement must be operative over a range of boiler operating conditions in a manner that appropriate mixing is achieved prior to the flue gas stream entering the precipitator; because the conversion of the newly produced $SO_2$ to $SO_3$ is not always 100% efficient, trace amounts of excess $SO_2$ may be produced; in many instances, significant runs of hot gas insulated duct-work must be included, together with complicated and costly manifold assemblies; and the like.

U.S. Pat. No. 5,011,516 describes an alternate approach to the types of systems illustrated in the '429 Patent, and teaches an arrangement wherein a slip stream of flue gas is drawn from the main flow and passed over a catalyst. A portion of the sulfur dioxide in the slip stream is oxidized to sulfur trioxide, and the slip stream is merged back into the main flue gas flow. While of interest, this approach has major drawbacks when implemented. System thermal efficiency is reduced because less heat is recovered. There is typically insufficient mixing of the slip stream with the main flow at the point where they rejoin, due to an insufficient pressure differential.

Moreover, the '516 patent does not disclose any approach which permits control of the amount of sulfur trioxide produced, responsive to variations in the sulfur content of the fuel and changes in other operating parameters. A patent to a related approach, U.S. Pat. No. 3,581,463, suggests using a fan to draw a portion of the hot gas flow into the slip stream, but gives no further details as to how the amount of sulfur trioxide can be controlled. One can imagine that valving could be added to the slip stream to control its total flow, but such valves are complex, expensive, and difficult to build.

U.S. Pat. No. 5,320,052, which is assigned to the same assignee as is this invention, provides an improvement over the approaches discussed above and includes a catalytic converter support adapted to be disposed across at least a portion of the cross-section of the main duct, and a catalyst for the oxidation of sulfur dioxide to sulfur trioxide is supported on the catalyst support. This system further includes a mechanical adjustment means for selectively adjusting the amount of surface area of the catalyst which is exposed to the flow of flue gas in the main duct. While it is believed that the '052 system is an advance over the prior art discussed hereinabove, several problems and/or deficiencies exist, for example: structural modifications to the duct, which are required in a retrofit and/or new installed FGC system of this sort, is expensive and may be difficult to achieve in many instances; mechanical complexity, with a resultant potential for breakdown; because the efficiency of the catalyst in converting $SO_2$ to $SO_3$ is dependent to a great degree on the temperature of the flue gas passing thereby, the amount of catalyst surface area required is relatively substantial and may result in a significant back pressure being created, which in turn may result in a decrease on power plant efficiency; and the like.

There is therefore a need for an improved approach to sulfur trioxide conditioning of flue gas streams. The present invention fulfills this need, and further provides related advantages.

SUMMARY OF THE INVENTION

The present invention provides an apparatus and method for sulfur trioxide conditioning of flue gas streams produced by fossil fuel power plants. This approach permits a selectively controllable amount of sulfur trioxide to be created and added to the flue gas stream. The apparatus used to accomplish the sulfur trioxide addition is simple and rugged, and readily controlled to precisely vary the sulfur trioxide addition. There is no sulfur burning apparatus or supply of sulfur required. No slip stream is taken from the flue gas stream, and no associated variable-speed fan or valving is used to achieve controllability. No additional sulfur dioxide is added to the flue gas stream with the sulfur trioxide addition. There is no difficulty in mixing the sulfur trioxide into the flue gas stream. No cumbersome or difficult to maintain equipment is required. No significant back-pressure is caused by the system of the present invention. Only a relatively minor modification to the duct work is required for the present invention.

In accordance with the invention, a sulfur trioxide conditioning system is provided for use in a fossil fuel-burning facility having a main duct for transporting sulfur dioxide-containing flue gas from a boiler, through a heat recovery apparatus, and to particulate removal equipment, such as an electrostatic precipitator, for subsequent discharge through a stack. The sulfur trioxide conditioning system includes catalytic converter means for converting a portion of the sulfur dioxide in the flue gas to sulfur trioxide. The catalytic converter means includes a catalyst support adapted to be disposed across at least a portion of the cross section of the main duct, and a catalyst for the oxidation of sulfur dioxide to sulfur trioxide supported on the catalyst support. The conditioning system further includes selectively variable temperature modifying means in communication with the catalyst support to selectively vary the temperature of at least portions of the catalyst, to in turn vary the amount of catalytic conversion of sulfur dioxide, in the flue gas passing thereby, to sulfur trioxide. The temperature modification means operates independently of the temperature of the flue gas.

The temperature modification means may be operable to heat or to cool the catalyst. A means for heating the catalyst can include, for example, an electrical heater within, or on, the catalyst support. A means for cooling the catalyst can include, for example, a coolant conduit within the catalyst support and a source of a coolant that is passed through the coolant conduit.

The temperature modification means can include either a means for heating, and/or a means for cooling. The catalyst may be placed at a location in the flue gas duct corresponding to a maximum operating catalyst temperature than might ever be required, and then selectively cooled by passing coolant through internal conduits. No heating will ever be required. The catalyst chamber can alternatively be located at a location corresponding to the coolest temperature required for the catalyst, and only a means for heating provided. Or anywhere in between, depending upon design parameters and desires.

The temperature modification means adjusts the catalyst temperature to a preselected level. The extent of the catalytically aided reaction is typically a strong function of the temperature of the catalyst. The present approach directly adjusts the catalyst temperature to that required to achieve the desired extent of reaction of the flue gas passing over the catalyst.

The approach of the invention is particularly effective in controlling the extent of reaction where a relatively small amount of the reactive component of the flue gas is to be catalytically converted. In the case of the conversion of $SO_2$ to $SO_3$ to produce sulfuric acid, only a few percent of the $SO_2$ is typically converted. The heating or cooling of the catalyst, as required, is highly effective in precisely controlling the extent of conversion.

The present invention provides an advance in the art of flue gas conditioning. Other features and advantages of the present invention will be apparent from the following more detailed description of the preferred embodiments, taken in conjunction with the accompanying drawings, which illustrate, by way of example, the principles of the invention.

DETAILED DESCRIPTION OF THE INVENTION

Figure 1:
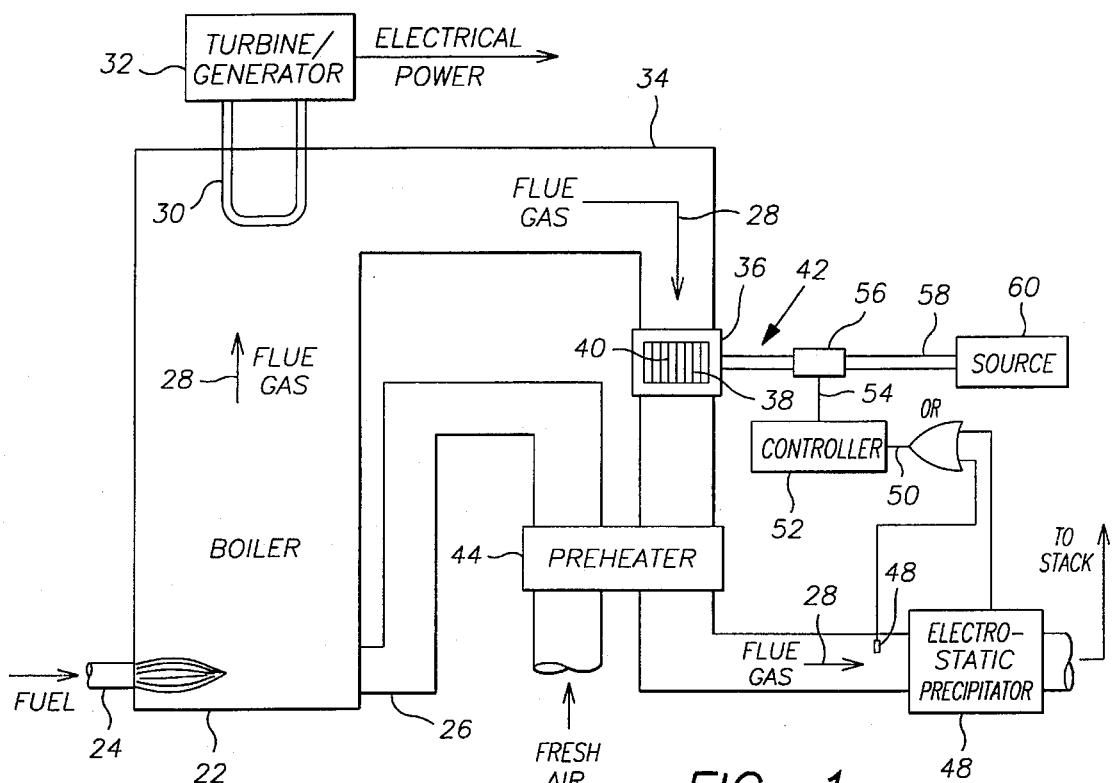
FIG. 1 is a schematic depiction of a fossil fuel power plant incorporating the principles of the present invention.

FIG. 1 schematically illustrates a fossil fuel burning power plant 20 utilizing the apparatus and method of the present invention. Briefly, the power plant includes a boiler 22, which receives a flow of fuel from a fuel inlet 24 and a flow of preheated fresh combustion air from a preheated air conduit 26. The fuel introduced through the fuel inlet 24, mixed with preheated fresh air, introduced through the air conduit 26, is combusted to produce flue gas 28. The flue gas 28 heats water flowing in boiler tubes 30 and converts it to steam, and the steam is supplied to a turbine/generator 32 which produces electrical power.

The flue gas 28 flows from the boiler 22 through an outlet flue gas conduit 34 to a catalyst portion or chamber 36. The catalyst chamber 36 includes a catalyst support 38, of any suitable configuration, and catalyst 40 supported thereon. The catalyst 40, which is operative for promoting a chemical reaction to convert a portion of the $SO_2$ in the flue gas stream to $SO_3$, may be any of several types of catalysts. Any suitable catalyst may be used for the oxidation of sulfur dioxide to sulfur trioxide (i.e. vanadium oxide, alkali metal pyrosulfates, and alkali metal oxides); however, for purposes of reducing the amount of catalyst required, and hence the potential back pressure and energy requirements, a precious metal catalyst is preferred. The catalyst is typically applied to the catalyst support 38 by a wash and pressure drop for typical applications should not exceed 5", and preferably 2", of water gage coat technique. The preferred $SO_2/SO_3$ catalyzed reaction will serve as the basis for the following discussion, but the invention is not so limited.

The catalyst chamber 36 further includes temperature modification means 42 for modifying the temperature of at least a portion of the catalyst, to be different than that of the flue gas 28. The means for modifying 42 is preferably disposed within the catalyst support 38, or otherwise in communication with the surface thereof. The means for modifying may be selected to heat the catalyst 40 to a temperature, preferable at least 50° F. greater than that of the flue gas 28, or to cool the catalyst 40 to a temperature below that of the flue gas 28. Further details of the various approaches to the means for modifying will be presented subsequently.

After leaving the catalyst chamber 36, the flue gas 28 passes through heat exchanger 44 that transfers heat from the flue gas 28 to the incoming fresh air in the air conduit 26. The cooled flue gas passes to a device for removing particulates therefrom, here illustrated as an electrostatic precipitator 46. After the removal of particulate matter, the flue gas passes to an exhaust gas stack.

At some point downstream of the location of the catalyst chamber 36, there may be provided an instrument to assess the extent of the catalytic conversion reaction catalyzed by the catalyst 40. In one preferred case, a resistivity monitor 48 may measure the resistivity of the flyash passing thereby. The resistivity of the flyash is one of the key factors which determine the efficiency of an electrostatic precipitator. The determination of the sulfur trioxide content of the flue gas, after it passes by the flue gas conditioning system of the present invention, is another way of assessing the effectiveness of the flue gas conditioning system of the present invention. On the other hand, the extent of the reaction may also be assessed by its effect on the performance of other parts of the pollution control system, for example, an opacity measurement at the stack exit, the current within the precipitator 46, gas temperature, and the like. The degree of heating or cooling of the catalyst 40 by the means for modifying 42 may be controlled by a resistivity measurement from the monitor 48, or an indirect measurement from the electrostatic precipitator 46, or otherwise.

A control signal 50 from either the monitor 48 or the electrostatic precipitator 46, or otherwise (i.e. boiler operating conditions) is received by a controller 52. The controller 52 determines whether greater or less temperature modification is required, and sends a command signal 54 to a modifying control 56. The modifying control 56 alters the flow of a modifier 58 from a source 60 to the means for modifying 42, thereby completing the control loop.

This discussion of a power plant is intended to be highly schematic in nature and to provide the information necessary to understand, practice, and enable the present invention. In an operating power plant there are typically many other systems that are not shown here. The present invention is compatible with such other systems and may be used with them.

Figure 2:
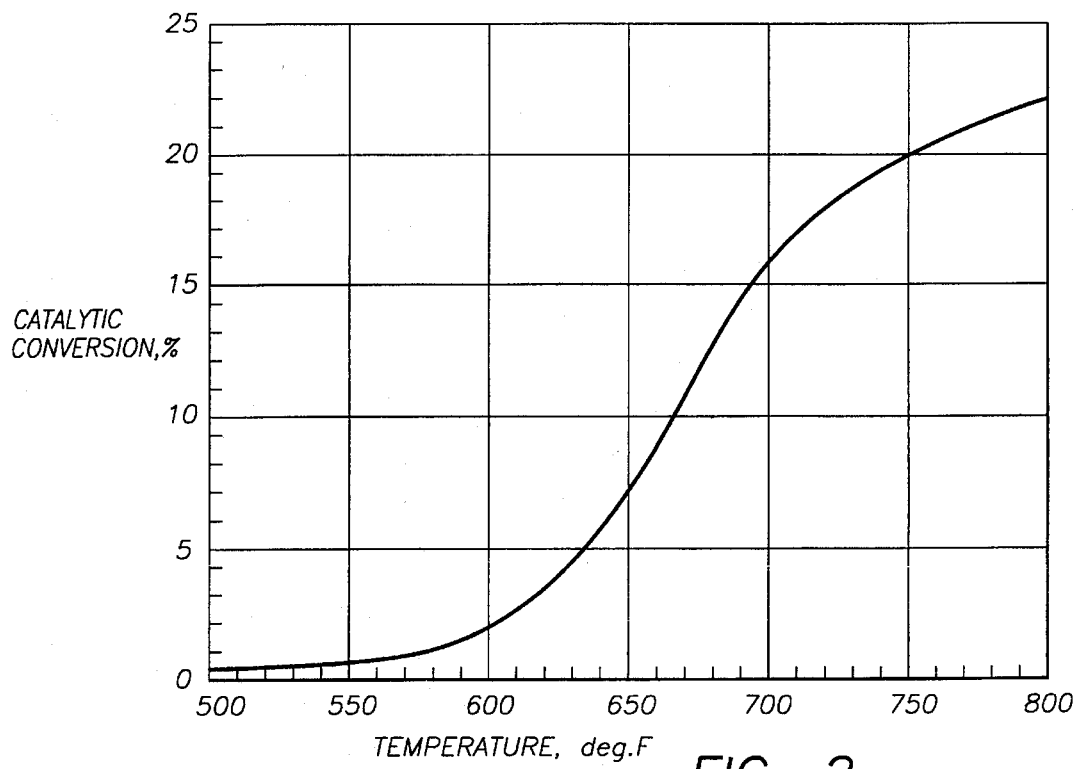
FIG. 2 is a schematic graph of catalyzed chemical reaction conversion as a function of catalyst temperature.

FIG. 2 depicts the conceptual origin of the present invention. The extent of a catalyzed reaction is, in many cases, strongly dependent upon the temperature of the catalyst 40 in the catalyst chamber 36. The higher the temperature of the catalyst, the greater the extent of completion of the reaction, preferably, the catalyst is active in the conversion of $SO_2$ to $SO_3$ at a temperature of substantially no less than 500° F. In the preferred case, the conversion of $SO_2$ to $SO_3$ in the presence of a catalyst proceeds further to completion at higher temperatures of the catalyst. In a preferred embodiment, the increase in the efficiency of the catalyst 40 for the conversion of $SO_2$ to $SO_3$ is at least 200% over the range from the temperature of the flue gas passing by the catalyst 40, to 100° F. higher. FIG. 2 illustrates such a preferred case wherein it is indicated that for a 50° F. rise in catalyst temperature (i.e. from 600° F. to 650° F.), the conversion efficiency of the catalyst rises from approximately 2% to 8%. In practice, the preferred range of conversion of $SO_2$ to $SO_3$ is from 0 to 20%, and even more preferred is from 0 to 10%, and is proportional, respectively, to the adjustment in the temperature of catalyst 40.

The present invention involves no moving parts inserted into the flue gas stream, and no alteration of the flow of the flue gas stream. Only the temperature of the catalyst is changed, thereby changing the extent of the catalyzed reaction. In the preferred approach, the temperature of the catalyst is changed from the "inside" by altering the temperature of the catalyst support 38, rather than from the "outside" by changing the temperature of the flue gas. (The temperature of the catalyst could also be changed by external radiation, for example, but in this event the temperature of the catalyst is changed, not that of the flue gas.) As it passes over the catalyst, the temperature of the flue gas can change to a minor degree, as the contact time between flue gas and the catalyst is relatively short. Moreover, in the preferred embodiment only a relatively small conversion of $SO_2$ to $SO_3$, on the order of 0.5 to 5 percent, is required, so there will be a relatively minor temperature change imparted to the flue gas as it flows through the catalyst chamber 36.

It is not necessary in most cases that the means for modifying 42 the temperature of the catalyst 40 achieve a uniform heating or cooling of the catalyst 40. The means for modifying may heat some portions of the catalyst 40 more than others, so that different regions of the catalyst 40 operate at different locations on the curve of FIG. 2. This operating condition is perfectly acceptable, and reflects the normal operating mode. Since there is a feedback controller 52 that controls the flow of the modifier 58 to achieve a particular result, any temperature variations will be accounted for by the control system. In some cases it may be desirable to achieve a uniform temperature throughout the catalyst 40, and in that case great care can be taken to design a uniform heating or cooling system.

FIG. 1 shows a single heating or cooling system for the catalyst chamber 36. There may be provided both a heating and a cooling system for the catalyst chamber if desired. However, for most cases it is possible to design the catalyst chamber such that only a single heating or cooling system is required. In one case, the catalyst chamber 36 is located relatively far upstream in the conduit 34 (close to the boiler 22) so that the flue gas is at a relatively high temperature as it enters the catalyst chamber 36. In this arrangement, the location of the catalyst chamber is selected so that it will never be necessary to heat the catalyst, within the operating limits of the power plant. Only a cooling system for the catalyst will be thence be required. On the other hand, the catalyst chamber 36 may be located further downstream in the conduit 34, so that the flue gas has cooled somewhat before it enters the catalyst chamber 36. The location of the catalyst chamber is selected so that it will never be necessary to cool the flue gas within the operating parameters of the power plant. In this case only a heater for the catalyst will be required. Either of the above described arrangements are acceptable, depending upon the design criteria, cost of energy, availability of coolant, system capital costs visa vis running costs (which may vary from plant to plant), and the like.

Figure 3:
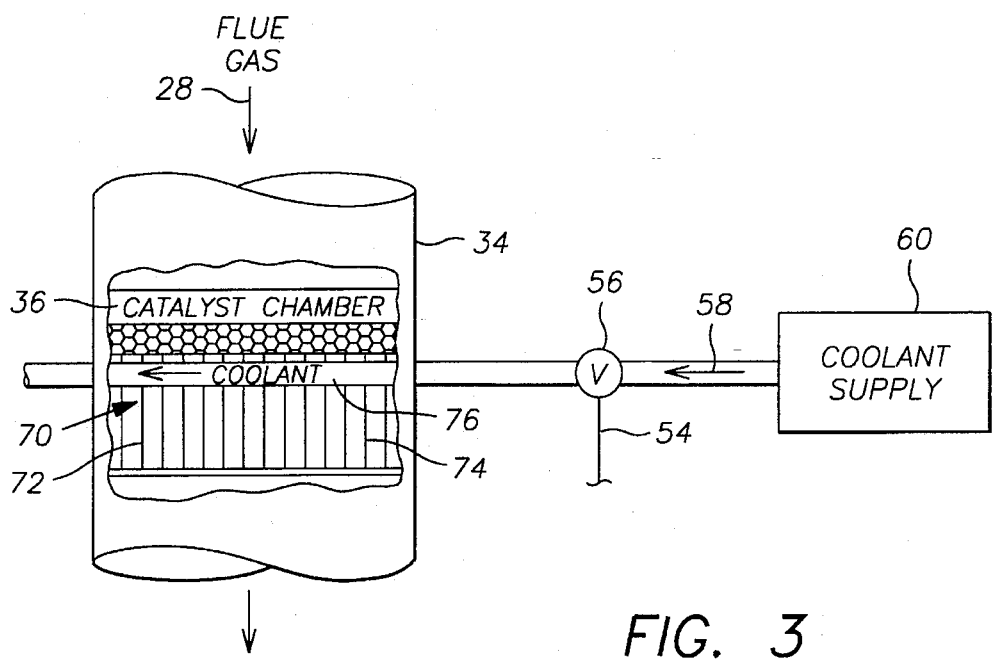
FIG. 3 is a perspective view of the interior of a honeycomb-style catalyst chamber with a coolant conduit therein.
Figure 4:
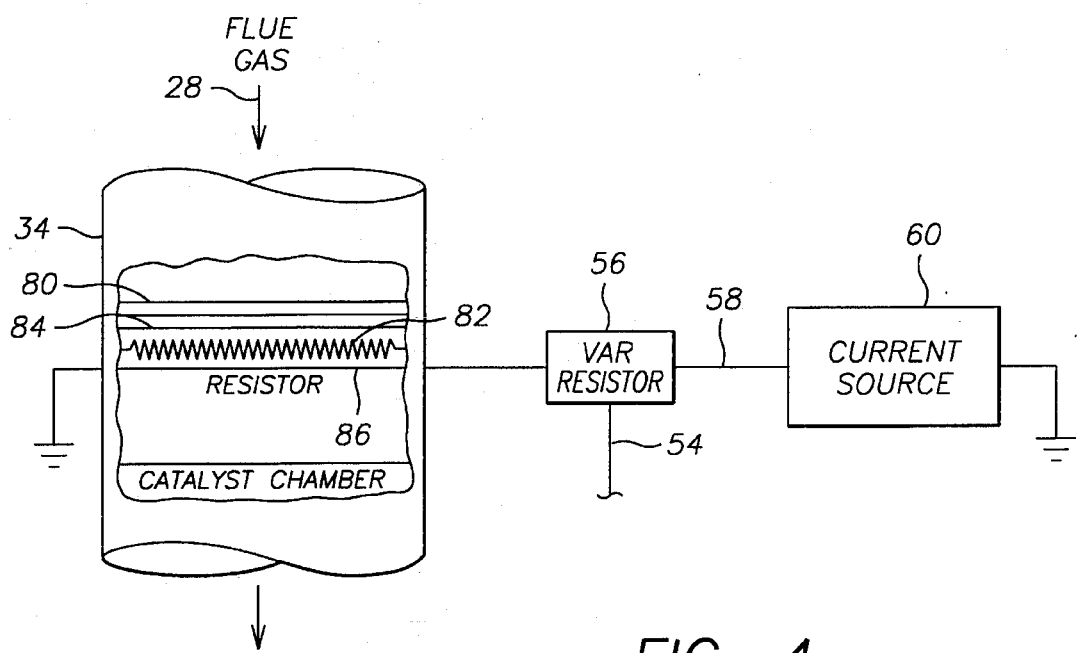
FIG. 4 is a perspective view of the interior of a plate-style catalyst chamber with a heating element thereon.

FIGS. 3 and 4 depict a cooling system and a heating system for the catalyst, respectively. In FIG. 3, a honeycomb-style catalyst support 70 has catalyst 72 on the surfaces 74 thereof. A coolant conduit 76 passes through the interior of the catalyst support 70. A coolant such as water is the modifier 58 of FIG. 1, the source 60 is a water source, and the modifying control 56 is a water flow valve. The flow of water through the conduit 76 cools the surfaces 74 and thence the catalyst 72 by conduction.

FIG. 4 illustrates a plate-style catalyst support 80, with catalyst 82 on the surfaces 84 thereof. A heating element 86 such as a resistor is carried by plate 80. Electrical current through the resistor is the modifier 58 of FIG. 1, the source 60 is an electrical current source, and the modifying control 56 is a current control such as a variable resistor. The heat produced by the electrical resistance in the heating element 86 heats the surfaces 84 and thence the catalyst 82 by conduction. Further description of the heating elements 86, and the support 80 therefore are not required, for electrically heated support arrangements are readily commercially available and are well known (i.e. see U.S. Pat. No. 5,213,780, which illustrates a heated catalytic surface to maximize catalytic NOx reduction). It is to be noted that the catalytic surface itself can be configured to maximize the surface presented to the flowing flue gas stream, such as using corrugations, or the like. It is envisioned that a number of supports 80 would be positioned within the duct 34, the actual number being dependent on a variety of design factors (i.e. the total surface area of catalyst required, the depth of the supports 80, the amount of conversion required, the type of fuel burned, the flue gas temperature passing thereby, the catalyst selected, and the like).

FIGS. 3 and 4 illustrate two preferred types of catalyst supports and their respective cooling and heating means. Other types of catalyst supports can similarly be used, and in each case any operable type of heating and cooling means can be used. Heating could also be accomplished by a diverted flow of high-temperature flue gas, but that approach requires valving and modification of the flue gas stream, a generally less desirable alternative.

In addition to the embodiments illustrated in FIGS. 3 & 4, it is to be understood that existing elements within the duct 34, and even portions of the duct 34, can be used as supports 38 for the catalyst 40, so long as they have surfaces exposed to the flow of flue gas 28. In this regard, is envisioned that known turning vanes within the duct 34 may be utilized for supports for catalyst in a manner as is taught by the invention herein.

Although a particular embodiment of the invention has been described in detail for purposes of illustration, various modifications may be made without departing from the spirit and scope of the invention. Accordingly, the invention is not to be limited except as by the appended claims.

What is claimed is:

1. In an apparatus for the selective control of the sulfur trioxide concentration in a flue gas, which flue gas is discharged from a fossil fuel burning device, contains ash and sulfur dioxide, and flows to a downstream electrostatic precipitator for the removal of the ash therefrom, the apparatus being adapted to be positioned in the flue gas intermediate the burning device and the precipitator and is operable to enhance the ash removal efficiency of the electrostatic precipitator, the improvement comprising:

catalyst support means, adapted to be disposed in the path of the flue gas, upstream of the precipitator;

a catalyst positioned on at least portions of said catalyst support means, in a manner that the catalyst is exposed to the flue gas passing thereby, for the conversion of a portion of the sulfur dioxide in the flue gas to sulfur trioxide;

said catalyst being sensitive to temperature in a manner that said catalyst is operative and increasingly more efficient, with increasing temperature, within a predetermined temperature range, in the conversion of sulfur dioxide to sulfur trioxide; and selectively variable temperature modifying means, in communication with at least portions of said catalyst support means, to selectively adjust the temperature of said catalyst on said at least portions of said catalyst support means, to in turn adjust the amount of catalytic conversion of the sulfur dioxide in the flue gas passing thereby, to sulfur trioxide.

2. An apparatus as specified in claim 1 wherein the flue gas communicates between the fossil fuel burning device and said electrostatic precipitator through a duct assembly, and said catalyst support means is deposed within the duct assembly.

3. An apparatus as specified in claim 2 wherein said catalyst support means comprises a plurality of spaced plates, with said plates being positioned so that the flue gas flows through the spacing between such plates.

4. An apparatus as specified in claim 2 wherein said catalyst support means comprises a plurality of longitudinally extending honey-comb members, with said honey-comb members being positioned so that the flue gas flows longitudinally therethrough.

5. An apparatus as specified in claim 1 wherein said catalyst is active in the conversion of sulfur dioxide to sulfur trioxide at a temperature of substantially no less than five hundred (500) °F.

6. An apparatus as specified in claim 2 additionally including turning vanes positioned within the duct and wherein said support means are, at least in part, the turning vanes.

7. An apparatus as specified in claim 1 wherein said temperature modification means comprises a heating assembly for heating said catalyst above the temperature of the flue gas passing by said support means.

8. An apparatus as specified in claim 1 wherein said temperature modification means comprises a cooling assembly for cooling said catalyst below the temperature of the flue gas passing by said support means.

9. An apparatus as specified in claim 7 wherein said heating assembly includes electrical heating elements in contact with said support means.

10. An apparatus as specified in claim 7, wherein said heating assembly includes a heated substrate incorporated within said support means.

11. An apparatus as specified in claim 1 wherein said catalyst is a precious metal catalyst.

12. An apparatus as specified in claim 1 wherein said temperature modification means is operative to adjust the temperature of selected portions of said catalyst differently from other selected portions of said catalyst.

* * * * *